United States Patent [19]

Winney

[11] Patent Number: 4,628,492

[45] Date of Patent: Dec. 9, 1986

[54] METHOD OF AVOIDING ALIASING IN SLANT STACKING OF SEISMIC DATA

[75] Inventor: Randy A. Winney, Garland, Tex.

[73] Assignee: Mobil Oil Corporation, New York, N.Y.

[21] Appl. No.: 569,820

[22] Filed: Jan. 11, 1984

[51] Int. Cl.⁴ .............................................. G01V 1/32
[52] U.S. Cl. ........................................ 367/63; 367/43; 367/73
[58] Field of Search .............................. 367/63, 73, 43

[56] References Cited

PUBLICATIONS

Application of the TAU-P Transform (Slant Stack) in Processing Seismic Reflection Data by Robert H. Tatham, Joe W. Keeney and Ilkka Noponen.
Generalized Radon Transforms and Slant Stacks, Geophys. J.R. astr. Soc. (1981) 66, 445-453 by C. H. Chapman, Dept. of Physics.
S. Treitel et al, "Plane-Wave Decomposition of Seismograms", Geophysics, vol. 47, No. 10 (Oct. 1982); pp. 1375-1401.

Primary Examiner—Thomas H. Tarcza
Assistant Examiner—Daniel T. Pihulic
Attorney, Agent, or Firm—Alexander J. McKillop; Michael G. Gilman; Charles J. Speciale

[57] ABSTRACT

A method for avoiding aliasing in τ-p transformation or "slant stacking" of seismic data is disclosed which features identification of frequency components of the data likely to be aliased during correlative summation steps and removal thereof from the data prior to summing.

2 Claims, 9 Drawing Figures

PRIOR ART

*Fig. 1*

(a) UNALIASED (b) JUST ALIASED (c) ALIASED

METHOD OF AVOIDING ALIASING IN SLANT STACKING OF SEISMIC DATA

FIELD OF THE INVENTION

This invention relates to improvements in seismic data processing. More specifically, the invention relates to a method for avoiding aliasing in the performance of so-called slant stacking, which process is also referred to as Radon transformation and as τ-p transformation.

BACKGROUND OF THE INVENTION

The use of slant stacking of seismic data also referred to in the art and herein as τ-p processing and sometimes also as Radon transformation is becoming increasingly common. According to this technique a conventional seismogram, that is, a collection of series of values each representative of the amplitude of the output of a geophone or hydrophone recorded with respect to time, are summed along a sequence of lines which are inclined at varying angles to the horizontal p. Stated differently, successive sample values of the amplitude are summed; each sample is time-delayed with respect to the previous sample, and the value of the time delay is proportional to the angle p. The resultant transform is referred to as a slant stack or a τ-p transformed seismogram. The slant stack has several properties which make it interesting and particularly useful for seismic processing purposes. One of these is that it permits removal of linear events, that is, of events which appear linear in X-t space, such as ground noise, because these appear merely as points in τ-p space. It also permits simulation of a spherical or curved wave as a planar wave. Certain seismic information may also appear more clearly in the τ-p transformed version of the data. An inverse transform is also available according to which the τ-p version of the data can readily be transformed back to the more conventional X-t version, whereupon conventional seismic data processing operations may be performed as desired.

As is true in other mathematical operations in which a signal is sampled at discrete intervals, aliasing, that is, erroneous sampling, can be a problem in τ-p processing. In the seismic environment, aliasing occurs when the move-out per trace, the spacing between adjacent geophones, is greater than half the period of the highest frequency component of the wavelet being considered. In more conventional terms, this amounts to wavelets on adjacent traces recorded with respect to a common event being displaced so much from one another so that they do not appear to be correlated. Aliasing occurs in connection with τ-p processing when the angle p along which given elements of traces are being summed departs from the angle of a particular reflection event on the X-t trace so much that wavelets from a common source appearing on successive traces appear more than 90° out-of-phase. Such aliasing, of course, can lead to misleading conclusions, as correlated events appear unrelated, and accordingly should be avoided.

The prior art recognizes the possibility of aliasing. See, for example, Chapman, "Generalized Radon Transforms and Slant Stacks" *Geophys. J.R.Astr.Soc.* (1981) 66, 445–453. In this reference, aliasing in τ-p transforms is recognized but the only suggestion made is to provide closer spacing of the detectors. This is obviously impractical in many cases. At the most recent Society of Exploration Geophysicists meeting, a paper was presented which also discussed aliasing in slant stacking, but only suggested removal of some velocity components of the data as a solution to this difficulty. This can lead to substantial distortion of the data and is thus not a desirable approach.

Accordingly, a need exists in the art for improved methods of avoiding aliasing in τ-p transformation of seismic data.

OBJECTS OF THE INVENTION

It is accordingly an object of the invention to provide an improved method of τ-p transformation in which the data is processed such that aliasing is effectively avoided.

It is a further object of the invention to provide a method of avoiding aliasing in τ-p processing operations which is not unduly complex, difficult or expensive of computer time to achieve.

SUMMARY OF THE INVENTION

The present invention satisfies the needs of the art and objects of the invention mentioned above by its provision of a method of τ-p transformation which involves identification of the frequency components of traces being summed at a given angle p which are likely to cause aliasing and filtering these frequency components out prior to the summing operation. The equation according to which these frequencies are identified is $$f = [2G|p - (x/tv^2)|]^{-1}$$

where
 f = frequency
 G = trace spacing
 p = summing angle
 x = source-to-receiver distance
 t = time; and
 v = velocity.

Values for these variables are all conventionally available in processing operations, so that no grave difficulty is encountered in identifying the frequency components of the data which are susceptible to aliasing nor in filtering them from the data being summed in generation of the τ-p transform.

BRIEF DESCRIPTION OF THE DRAWINGS

The invention will be better understood if reference is made to the accompanying drawings in which.

DESCRIPTION OF THE PREFERRED EMBODIMENTS

Figure 1:
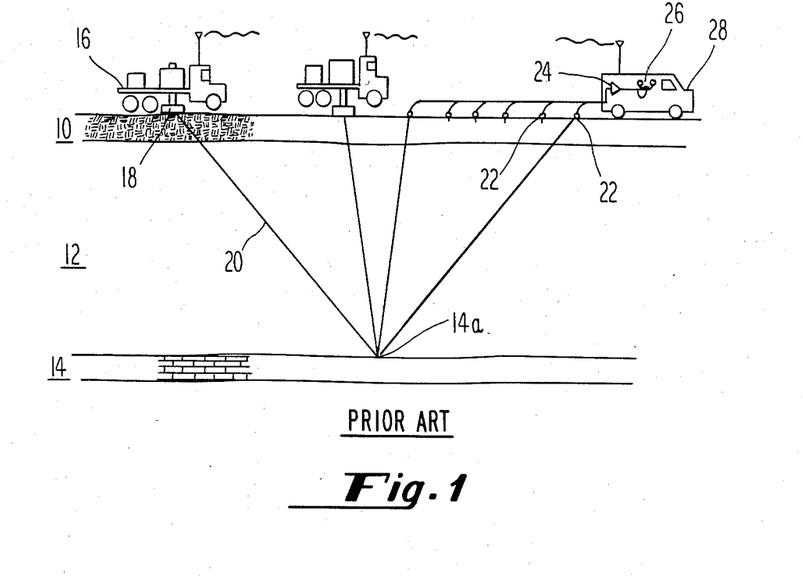
FIG. 1 shows generally the field equipment used in seismic exploration of the earth.

FIG. 1 shows the general scheme of seismic exploration operations. A source of seismic energy typically, as shown, a truck 16, is located at one point on the surface of the earth and transmits seismic waves along a path 20 in the earth, through varying layers 10 and 12. It is reflected at a third layer 14 back upwardly and is detected by geophones 22. The signals output by the geophones are amplified as at 24 and are recorded as at 26 by equipment carried in a second truck 28. As shown, the truck 16 is fitted with a platen 18 upon which the truck is raised. The entire truck is then vibrated and this vibration is the source of the seismic wave. It should be appreciated, however, that other sources of seismic energy are well known.

Figure 2:
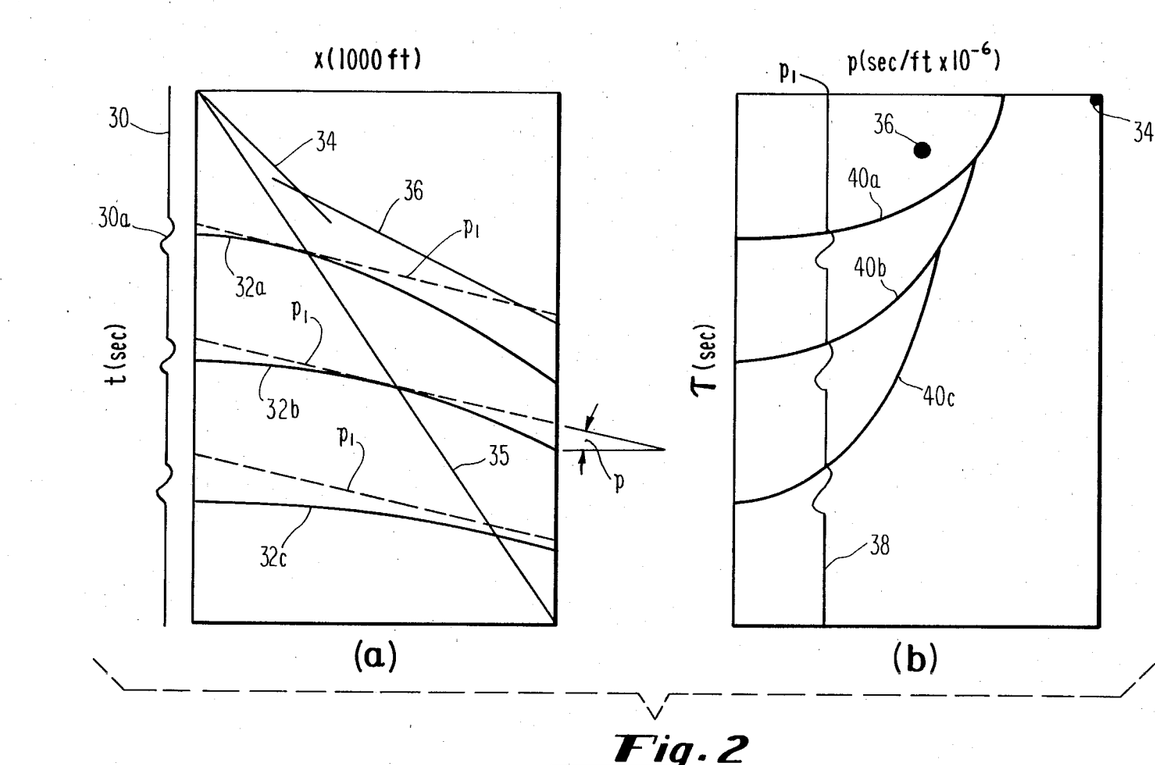
FIG. 2 shows a schematic diagram of seismograms recorded in exploration of the earth and how they may be transformed to τ-p representations thereof.

As shown, a large number of geophones 22 are typically used and the outputs of the geophones 22 are typically recorded with respect to time. When plotted, these signals are referred to as traces. When a large number of traces from adjacent geophones 22 are plotted next to one another, wavelets in the traces caused by detection of a seismic wave reflected from a rock layer 14 will closely adjoin one another. Accordingly, these correlated wavelets provide a representation of the structure of the earth and can be used by geophysicists in the search for oil, gas and other minerals. FIG. 2(a) shows such seismograms schematically. At the left, at 30, is shown a typical single trace. A large number of these traces output by geophones 22 may be plotted in close juxtaposition to one another and will typically have similar wavelets 30a adjoining one another. General trends in the data corresponding to more or less horizontal continuous structure within the earth appear as down-sloping hyperbolae 32a, 32b and 32c due to the increasing time required for the signal to reach geophones 22 positioned longer distances away from the source of energy 16. (It will be appreciated that the data of FIG. 2(a) has not been normal-move-out corrected. This is usual in τ-p transformation.) Other events appearing on the seismogram of FIG. 2a are linear events shown at 34, 35 and 36. These may be groundroll as at 35 and refraction events as at 34 and 36. As shown in FIG. 2a, the units of the diagram are time in the vertical direction and distance x between the source and receiver horizontally. The individual traces thus each represent the output of an individual geophone over time. A plurality of geophones at each location may also be used.

FIG. 2(b) shows a schematic representation of the τ-p transformation corresponding to FIG. 2(a). To construct this transformation, the individual amplitude values of elements of each trace along a straight line at an angle p are summed to generate a single point on a trace in τ-p space. The line at angle p is "moved down" and the corresponding next points on each trace are then similarly summed to generate the next point, and so on. For example, three parallel lines $p_1$ are shown in FIG. 2a. All of the values for the amplitude of seismic traces of FIG. 2(a) lying along a given line $p_1$ at angle p are summed to generate a single point on a vertical line $p_1$ in τ-p space. Points along another line $p_1$ also at angle p but displaced from the previous line are then summed to generate the subsequent point, and so on. These points are then graphed to generate a single τ-p trace as at 38 in FIG. 2b. Angle p is then varied and a second series of such summations is performed with respect to this new angle p, to generate another trace in τ-p space. The net result as shown in FIG. 2(b) is that the generally hyperbolic shapes of the events shown at 32a, 32b and 32c of FIG. 2(a) are transformed into elliptical shapes 40a, 40b and 40c respectively on the τ-p transform of FIG. 2(b). One significant virtue of this processing step is that events that interfere in the X-t representation of FIG. 2(a) are separated in the τ-p space of FIG. 2(b). In particular, the linear event 35 representing groundroll has a slope which is beyond the range of p values used to generate the τ-p transformation and simply disappears. The refractions 34 and 36 of FIG. 2(a) appear as points or relatively small regions, shown at 34 and 36 of FIG. 2(b) and can readily be removed from the τ-p data. Upon performance of the inverse transform the linear event 35 and the refractions 34 and 36 are thus eliminated from the data and the corresponding X-t transformation is much easier to interpret.

The units of τ-p transforms shown in FIG. 2(b) are time, again seconds, and p, here seconds/feet $\times 10^{-6}$, that is, reciprocal velocity. This amounts to the slant of the angle p along which a given summation is taken to generate a single trace 38 of the τ-p transform of FIG. 2(b).

The inverse transform, τ-p space back to X-t space, is well understood and documented in the art; it involves a similar step of summing the τ-p data at varying angles.

It will be appreciated by those skilled in the art that the meaningfulness of summations of this kind arises when wavelets on adjoining traces which are physically correlated due to being caused by similar structures in the earth are mathematically correlated by summing across these wavelets. It will similarly be appreciated by those skilled in the art that where the wavelets are offset with respect to one another and are summed across at an angle p such that they are effectively out of phase, the well known phenomenon of "aliasing" can occur and that this will necessarily result in a loss of data, if not an actual error, in performance of the transformation.

Figure 3:
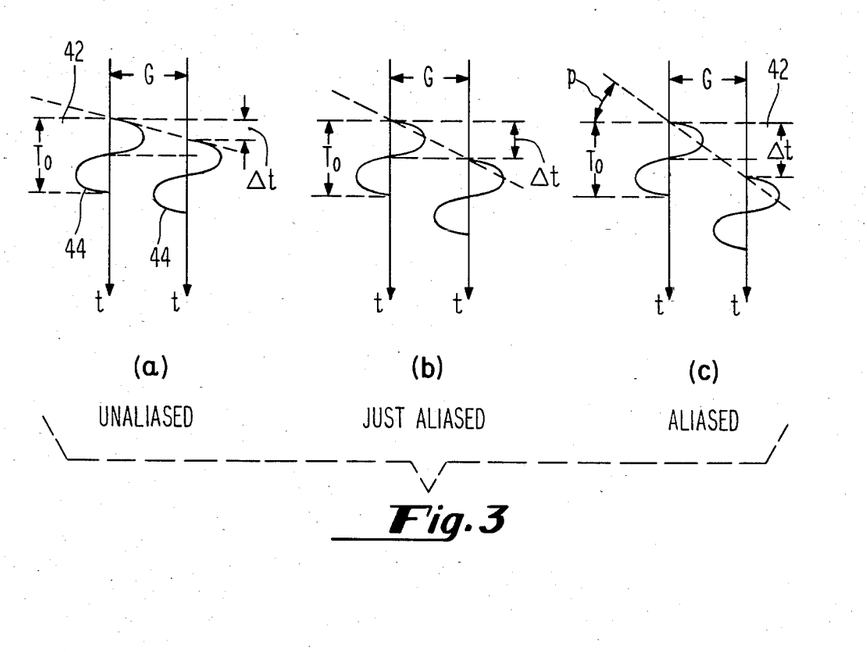
FIG. 3 is a schematic diagram showing how aliasing can arise in such processing.

FIG. 3 shows how aliasing can arise. FIG. 3(a) shows two wavelets 44. Here the wavelets are offset by a time difference Δt in one direction and physically by a distance G in another direction. Aliasing occurs when the move-out per trace, Δt, that is, the time difference is greater than half the period $T_0$ of the wavelet. FIG. 3 shows summation along a horizontal line 42. FIG. 3(a) shows an unaliased waveform, Δt being significantly less than half the period $T_0$. FIG. 3(b) shows aliasing beginning to occur, where Δt is equal to half the period. Finally, in FIG. 3(c), aliasing is quite significant, as Δt is greater than half the period $T_0$. Hence, summation along a horizontal line between these two wavelets, which may actually relate to physically correlated structure, will effectively result in subtraction of one from the another rather than addition.

In the τ-p transformation process, the angle p over which the summing takes place is varied to generate the transform. Accordingly, the amount of move-out per trace, Δt in FIG. 3, is effectively varied with the angle p, and is additionally a function of the physical spacing of the traces G in FIG. 3, the source-to-receiver distance x and the highest frequency component of the wave f. That is, for example, if the tangent of angle p were equal to Δt/G in FIG. 3(c), there would be no aliasing of these two wavelets in generation of the τ-p transform. However, if the same angle p were applied to summation of the wavelets of FIG. 3(a), aliasing would occur. Accordingly, it has been realized by the present inventor that aliasing in τ-p transformation is a function of the variables listed above and that if frequency components of the data which would be aliased when summed are identified prior to summing and removed, aliasing can accordingly be avoided. The present inventor has realized that the equation relating these variables is the following:

$$f = [2G|p - (x/tv^2)|]^{-1} \quad (1)$$

where
- f is the frequency component of data which would be aliased if summed;
- G is the spacing between adjacent traces;
- p is the summing angle of interest;
- x is the source-to-receiver distance of a particular trace being summed;
- t is time; and
- v is wave velocity.

Accordingly, the invention here comprises identifying these frequencies and removing that frequency component from the data which would be aliased if summed prior to summing to generate the τ-p transform.

Figure 4:
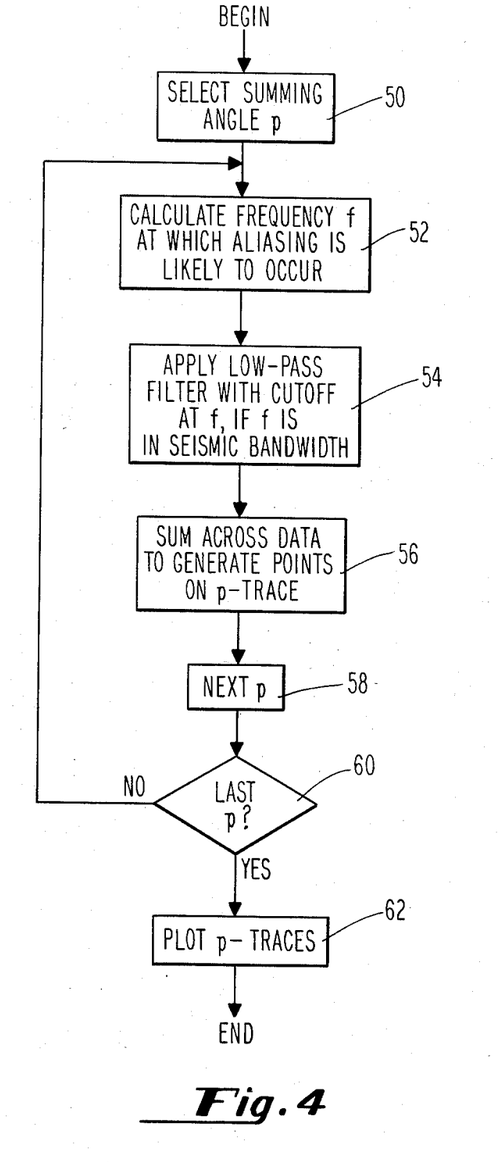
FIG. 4 is a flowchart of the method of the invention for avoiding such aliasing.

FIG. 4 shows a flowchart by which τ-p transforms can be generated having had this aliased data removed. The process begins with selection of the summing angle p at 50. The variables necessary to calculate the frequency of likely aliasing will typically have been recorded as part of the seismic data. These would include the trace spacing, G, which corresponds to the spacing of adjacent detectors on the surface of the earth, X, the source-to-receiver distance, t, the time of arrival of a given wavelet which can be observed from the seismic record, and v, the velocity of the wave, which is determined by examination of the record. The frequency f of likely aliasing is then calculated at 52 according to equation (1):

$$f = [2G|p - (X/tv^2)|]^{-1} \quad (1)$$

If this frequency f is in the seismic bandwidth, a low pass filter having this as the cutoff value is applied to the data at 54. Typically this will be performed in accordance with the teachings of the art, that is, by Fourier transformation of the data, application of the appropriate digital filter and then retransformation of the data back to the time domain. Such frequency domain filtering is well understood in the seismic processing art. Points on a p trace corresponding to a particular value for the angle p are generated by summing across the X-t traces, one sum per point on the p-trace, as discussed above in connection with FIGS. 2(a) and 2(b). The next value for p is then selected at 58; if this is the last p value, as determined at 60, the τ-p transform can be plotted at 62. If not, the process is repeated. It will be observed that the likely aliasing frequency f is calculated individually for each value p, because p appears in Equation 1 and is thus determinative of the frequency at which aliasing is likely to occur. It will also be observed that by filtering only those frequency components from the data which are likely to be aliased, the data is distorted far less that it would be if the velocity components of the wave likely to be aliased are removed, as suggested in the prior art, and that the process can be performed on prerecorded data at will and without modification to standard geophone spacing practice as also suggested by the prior art.

Figure 5:
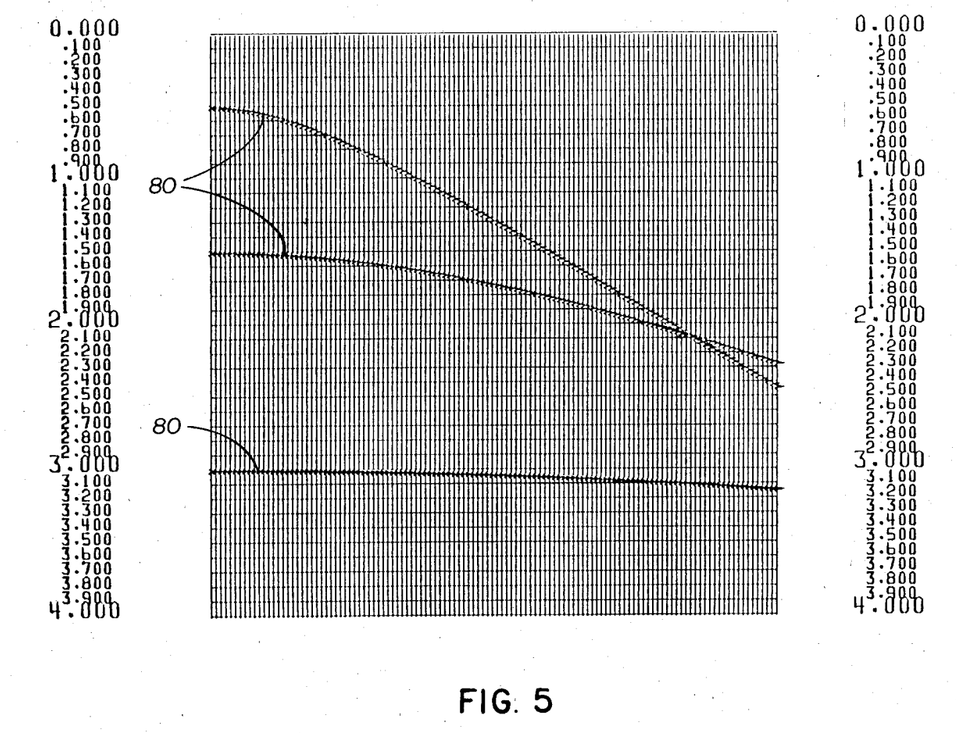
FIG. 5 is a synthetic seismogram.
Figure 6:
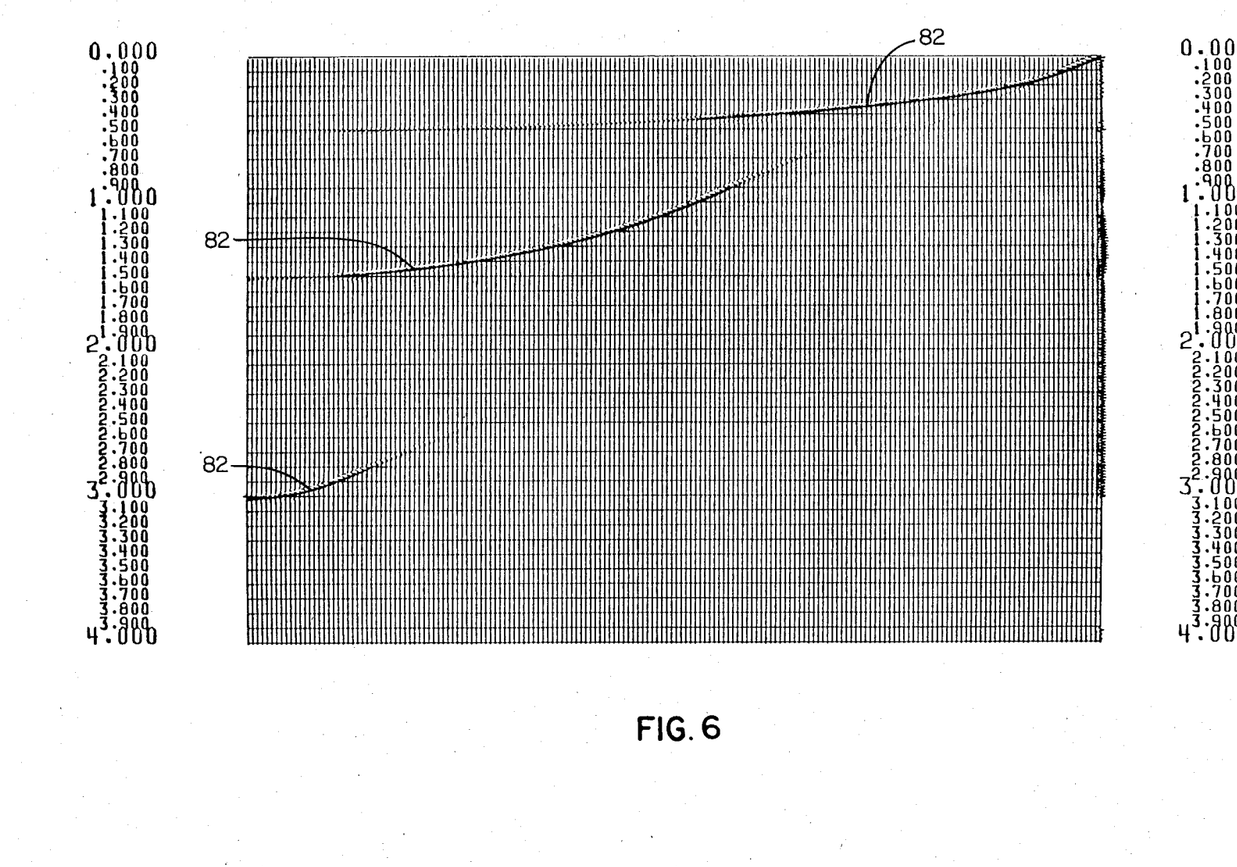
FIG. 6 is a τ-p transformed version of the seismogram of FIG. 5, without correction according to the method of the invention.
Figure 7:
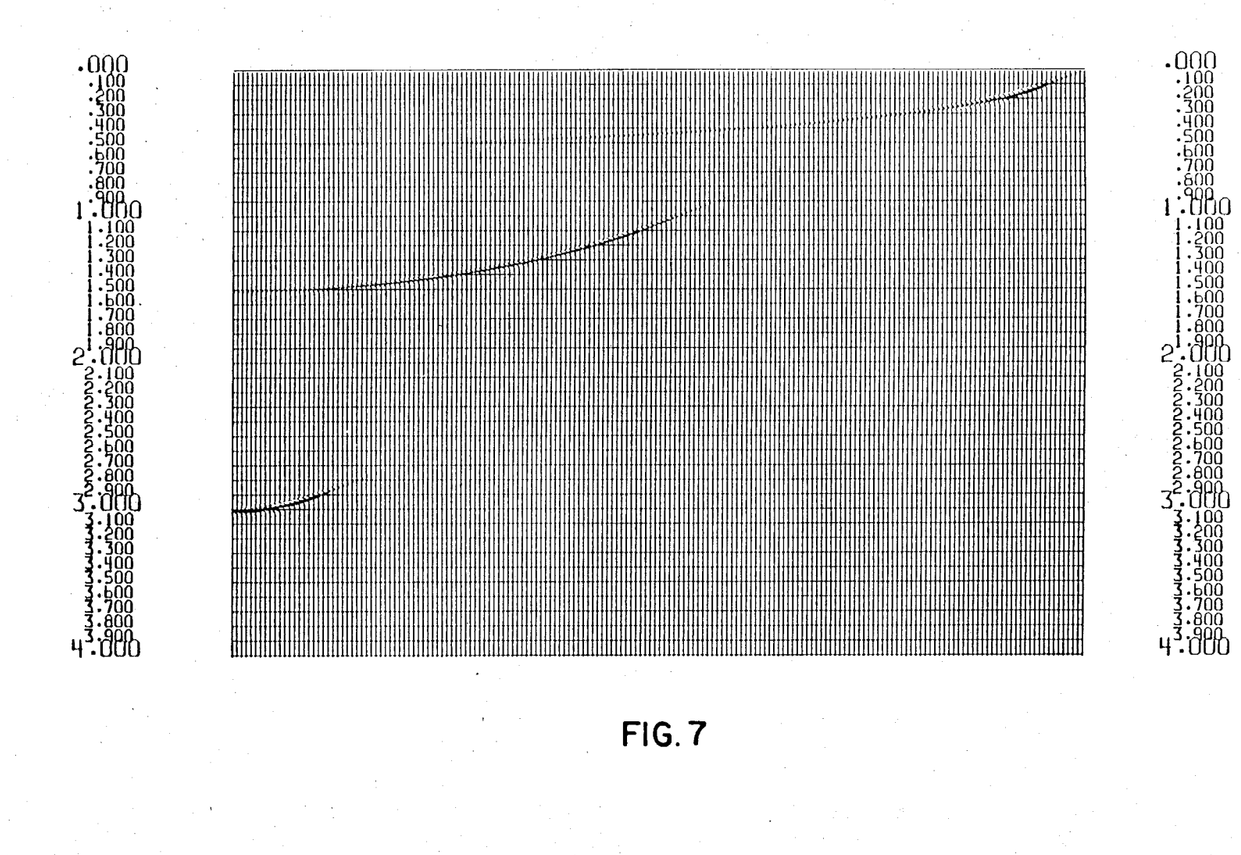
FIG. 7 is a τ-p transformation of the data of FIG. 5 with correction according to the invention.

FIGS. 5 through 9 give examples of the application of the method of the invention to seismic data. FIG. 5 shows a synthetic common shot record, that is, it represents modeled seismic data. FIG. 6 shows the data of FIG. 5 having been transformed into τ-p space without filtering according to the invention to remove aliasing. The characteristic elliptical transformed versions of the hyperbolic traces 80 of FIG. 5 appear at 82 in FIG. 6. However, some noise is present in FIG. 6. FIG. 7 shows a comparable τ-p transform of the data in FIG. 5 having had filtering performed to remove aliased data according to the method of the invention. The noise of FIG. 6 is absent from the τ-p transformed version of the data shown in FIG. 7.

Figure 8:
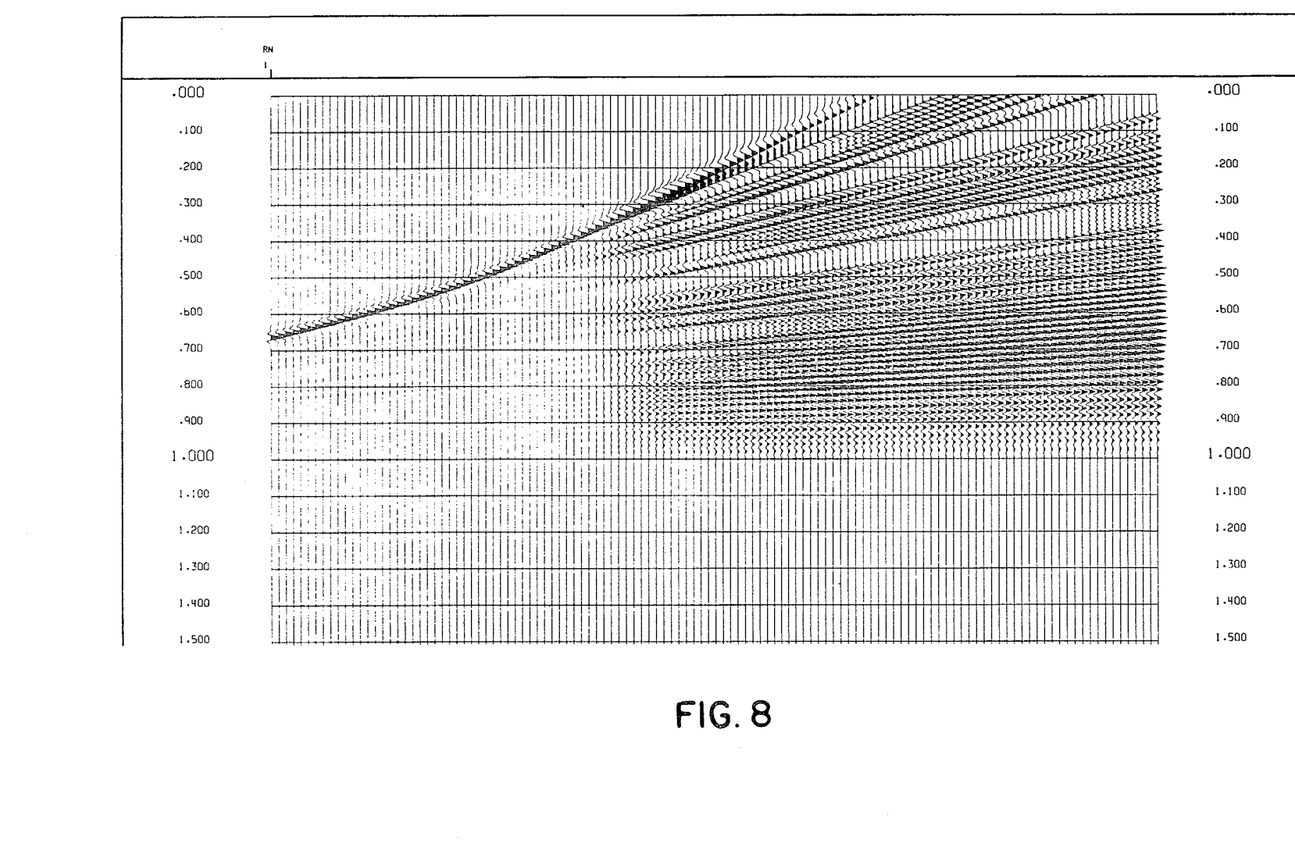
FIG. 8 is an example of a τ-p transformed version of additional synthetic data, made without correction according to the method of the invention.
Figure 9:
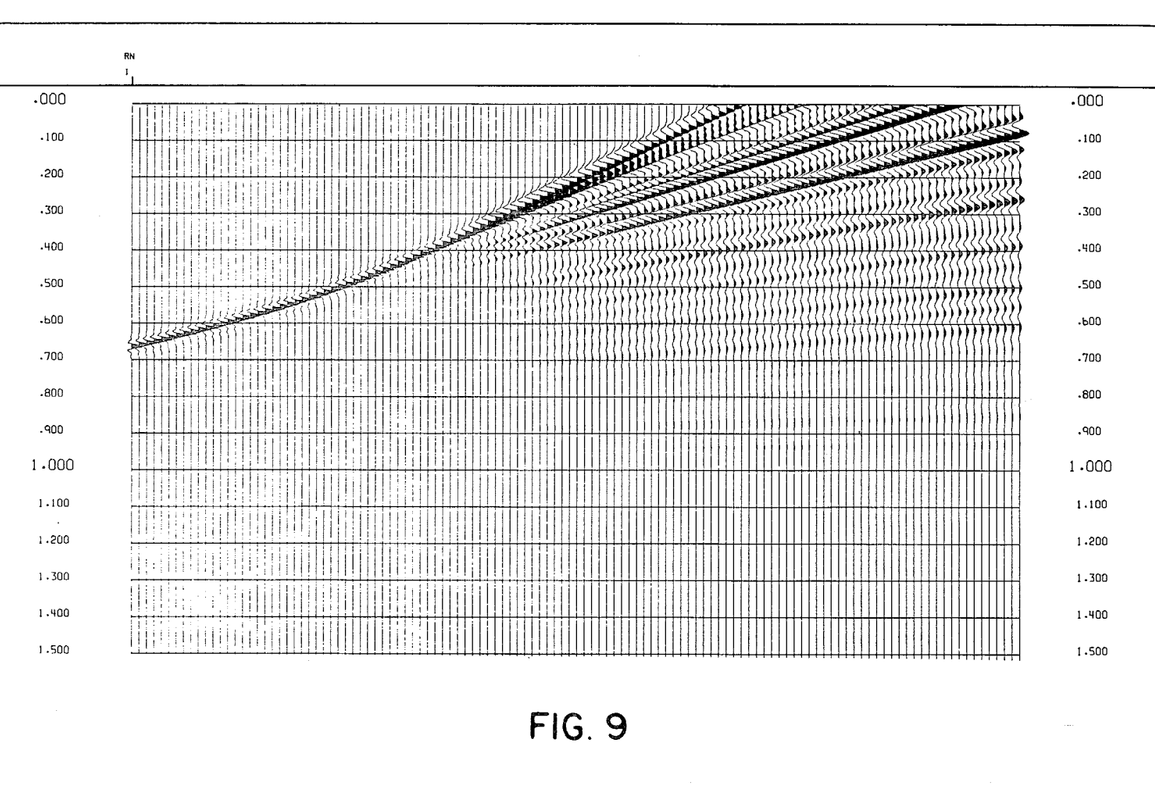
FIG. 9 is a τ-p transformation of the same synthetic data, made with correction according to the invention.

FIGS. 8 and 9 give a second and perhaps more clear example of the result of the use of the method of the invention. Both are τ-p transformed versions of the same data; FIG. 8 was generated without use of the invention, and FIG. 9 was generated with use thereof.

The input data for generation of this example was a synthetic 120 trace record in x-t space. The near trace offset was 0 ft., far trace offset 11,900 ft. with a trace spacing of 100 ft. A reflection hyperbola with a zero-offset arrival time of 1.0 sec. and a velocity of 5000 ft./sec. was used. The wavelet employed was zero phase with a 10 Hz–60 Hz bandwidth.

FIG. 8 is the τ-p transform of the input record without the use of the invention. The left-most trace represent a p value of 15 microsec./ft. and the right-most trace a p value of 250 microsec./ft. The linear events on the right side of the figure are noise resulting from spatial aliasing.

FIG. 9 differs for FIG. 8 only in that the invention was used in the generation of FIG. 9. Note that the noise resulting from spatial aliasing has been substantially reduced. The reason the noise has not been totally eliminated is because spatial aliasing in τ-p transforms is a time variant phenomenon and therefore, is not easily handled in the frequency domain. Since the method of the invention is performed in the frequency domain, spatial aliasing is assumed to be time invariant. This is an approximation, of course, which results in the imperfect removal of the noise; however, a clear improvement is nevertheless realized.

While the preferred embodiment of the invention has been shown and described, the invention should not be limited by the above exemplary description but only by the appended claims.

I claim:

1. The method of transforming seismic data traces recorded in x-t space to τ-p space comprising the steps of:
   selecting an initial summing angle p;
   identifying frequency components of said input data liable to be aliased with respect to a given angle p, said frequency components of said data liable to be aliased are identified by the equation $$f = [2g|p - (x/tv^2)|]^{-1}$$

f is frequency component of the data liable to be aliased,
   p is the summing angle,
   g is the trace spacing,
   x is the source to receive distance at which the seismic data is taken,
   t is time measured from the input of seismic energy to the earth, and v is velocity of the seismic energy through the earth;

filtering said frequency components liable to be aliased prior to summation to generate points for said p trace;

summing individual elements of seismic traces in x-t space, said elements of said traces lying along a line making the angle p with respect to the horizontal to generate points on said p traces which together make up a τ-p transform;

repeating said steps with respect to differing angles p; and plotting said p traces to generate a τ-p representation of said data.

2. A method of avoiding aliasing in transformation of seismic data in x-t space to a representation thereof in τ-p space wherein said transformation involves a correlative summing step, comprising the steps of:

identifying frequency components of the input data likely to be aliased in such transformation; said identification of frequency components of the data which are liable to be aliased in transformation is performed according to the equation $$f = [2G|p - (X/tv^2)|]^{-1}$$

wherein f is the frequency component of the data liable to be aliased, p is the summing angle, G is the trace spacing, X is the source-to-receiver distance with respect to which the seismic data was recorded, t is time measured from the input of seismic energy to the earth, and v is velocity of the seismic energy through the earth; and filtering such frequency component from the data prior to transformation thereof.

* * * * *